Feb. 10, 1942.   J. H. MULLEN   2,272,222
EMERGENCY REPAIR PIPE
Filed May 1, 1940
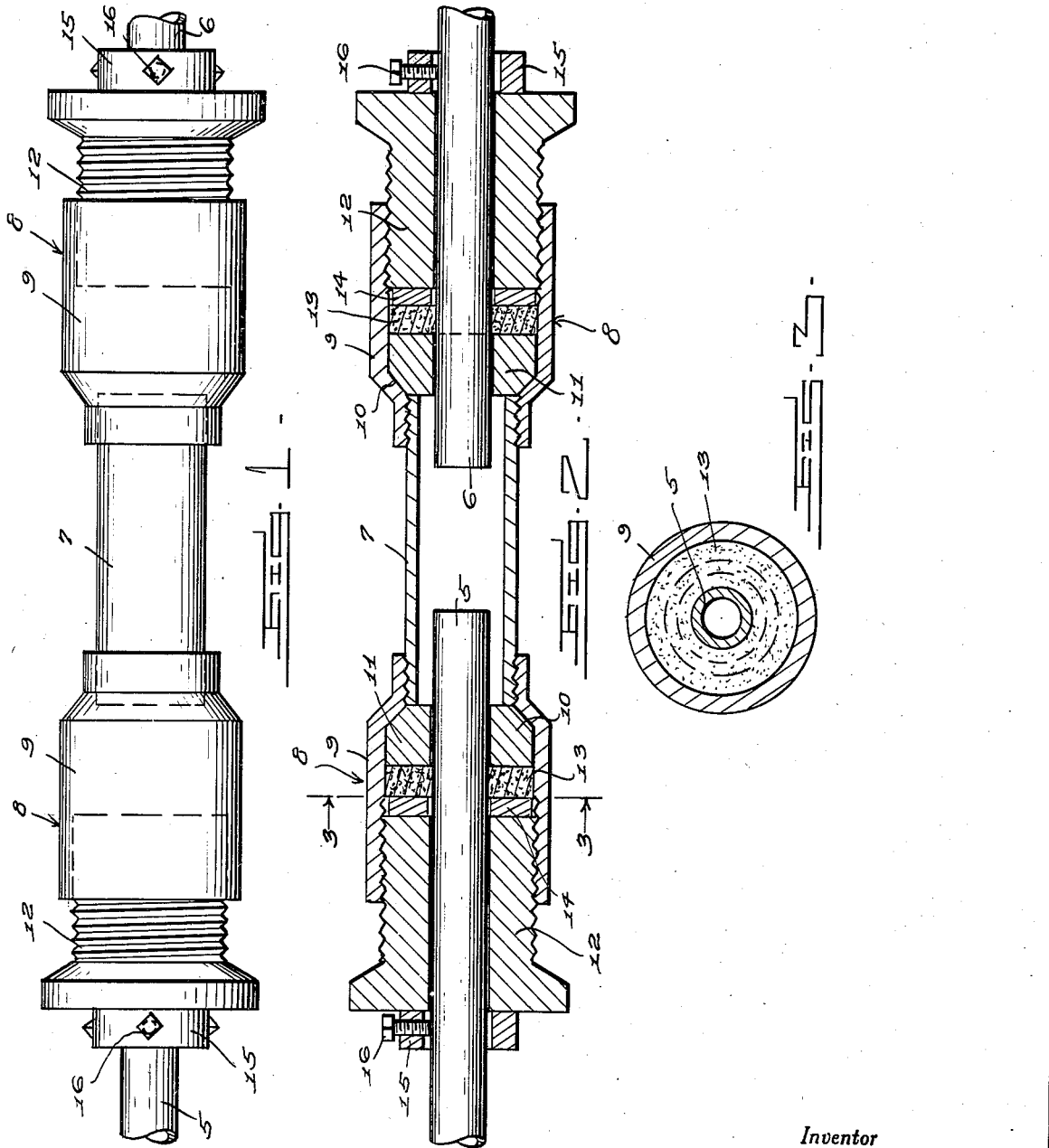
Inventor
JAMES H. MULLEN,
By *Clarence A. O'Brien*
Attorney Patented Feb. 10, 1942

2,272,222

UNITED STATES PATENT OFFICE 2,272,222

EMERGENCY REPAIR PIPE

James H. Mullen, Chicago, Ill., assignor to Sadie T. Mullen, Chicago, Ill.

Application May 1, 1940, Serial No. 332,803

1 Claim. (Cl. 285—196)

The present invention relates to new and useful improvements in emergency or temporary repair pipes adapted for installation in a water or other pipe line and has for its primary object to provide a fitting adapted for attaching to each end of the pipe after a defective section thereof has been removed for securing a pipe sleeve therebetween to form a union between the severed ends of the pipe.

A still further object is to provide a pipe fitting of this character of simple and practical construction, which is efficient and reliable in performance, relatively inexpensive to manufacture, easy to install in position and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which—

Figure 1 is a side elevational view,

Figure 2 is a longitudinal sectional view, and

Figure 3 is a transverse sectional view taken substantially on a line 3—3 of Figure 2.

Referring now to the drawing in detail, the numerals 5 and 6 designate a pair of pipe sections which have their ends terminating in spaced relation, after a defective portion of the pipe has been removed therefrom. Telescoping over the adjacent ends of the pipe is a coupling sleeve 7, each end of the sleeve being externally threaded and secured to the adjacent section of the pipe by means of a fitting designated generally at 8, the fittings at the respective ends of the sleeve being of duplicate construction and accordingly, a detailed description of one will suffice for both.

The fitting includes a reducing member 9 internally threaded at each end and having its reduced end secured to one end of the sleeve 7. The reducing member includes an intermediate tapering portion 10 within which is conformably fitted a plug 11 having a central bore for receiving the pipe. Threaded in the outer end of the reducing member 9 is a packing nut 12 and interposed between the plug 11 and the nut 12 is a fiber gasket 13 and a metallic washer 14, the gasket being adapted for compressing against the walls of the pipe 6 and the interior of the reducing member 9 whereby to provide a liquid tight seal for the pipe.

A collar 15 is mounted on the pipe and secured in position against the outer end of the nut 12 by means of a set screw 16, the collar 15 at each end of the assembled structure preventing sliding movement of the repair pipe on the pipe sections 5 and 6 in a manner as will be apparent.

It will be noted from an inspection of Figure 2 of the drawing that the inner end of the plug 11 abuts the adjacent end of the sleeve 7 and the tapered portions of the reducing member 9 and the plug provide a ground joint which, upon the tightening of the nut 12 will form a liquid tight seal between the parts.

It is believed the details of construction, advantages and manner of use of the device will be readily understood from the foregoing without further detailed explanation.

Having thus described the invention, what I claim is:

In a device of the class described, a sleeve, a pipe of smaller diameter than the sleeve and having one end extending thereinto, a tubular member having a reduced end threaded to one end of the sleeve and said member surrounding a portion of the pipe, said member having an intermediate portion tapered and its major portion of cylindrical shape with the tapered portion extending from the cylindrical portion to the reduced part which is threaded to the sleeve, a plug fitting in the tubular member and surrounding the pipe and having one end bearing against the end of the sleeve with said plug having a tapered portion bearing against the tapered part of the tubular member, a packing ring in the tubular member having one face bearing against the plug and an elongated nut member threaded in the cylindrical part of the tubular member and surrounding a part of the pipe and acting to compress the packing ring and to force the tapered part of the plug against the tapered part of the tubular member and a collar adjustably connected with the pipe and engaging the outer end of the nut to prevent inward sliding movement of the pipe.

JAMES H. MULLEN.